United States Patent [19]

Hessling, Jr.

[11] Patent Number: 5,198,796
[45] Date of Patent: Mar. 30, 1993

[54] OUTBOUND SIGNAL DETECTOR SYSTEM AND METHOD

[75] Inventor: John B. Hessling, Jr., St. Charles, Mo.

[73] Assignee: Distribution Control Systems, Inc., Hazelwood, Mo.

[21] Appl. No.: 722,134

[22] Filed: Jun. 27, 1991

[51] Int. Cl.$^5$ .................... H04B 23/00; H04M 11/00
[52] U.S. Cl. ....................... 340/310 A; 340/310 R; 375/36; 375/37; 370/6
[58] Field of Search ........ 340/310 A, 310 R, 310 CP; 375/36, 37, 99; 370/6, 7

[56] References Cited

U.S. PATENT DOCUMENTS

| | | | |
|---|---|---|---|
| 4,105,897 | 8/1978 | Stratton et al. | 307/3 |
| 4,106,007 | 8/1978 | Johnston et al. | 340/310 |
| 4,218,655 | 8/1980 | Johnston et al. | 455/39 |
| 4,400,688 | 8/1983 | Johnston et al. | 340/310 |
| 4,914,418 | 4/1990 | Mak et al. | 340/310 |
| 4,996,513 | 2/1991 | Mak et al. | 340/310 |

*Primary Examiner*—Donnie L. Crosland
*Attorney, Agent, or Firm*—Polster, Lieder, Woodruff & Lucchesi

[57] ABSTRACT

In a communication system in which outbound information in the form of multi-bit messages is carried by cyclic waveforms over an electric power distribution network, the signal is detected independently at any of a plurality of locations remote from the source by obtaining signal data by sampling the cyclic waveform over a predetermined portion of successive cycles. The predetermined portion is divided into a plurality of predetermined ranges. From a predetermined number of bits at the start of each message, the particular predetermined range which contains the greatest signal strength is selected. For the remaining bits of the message, only those samples in the selected range are analyzed to detect the outbound message. To reject cross-talk, preselected ranges in which cross-talk signals are likely to appear are monitored, and the in-phase messages are rejected when theh signal strength in the in-phase range is less than the signal strength in at least one of the cross-talk ranges.

33 Claims, 2 Drawing Sheets

SIGNAL = ΔT1 + ΔT2     FIG. 1A.

OUTBOUND SIGNAL DETECTOR SYSTEM AND METHOD

BACKGROUND OF THE INVENTION

This invention relates to carrier wave intelligence systems in general and, more particularly, to apparatus useful in detecting and extracting information or intelligence transmitted outbound to electricity meters and the like over electric power distribution networks from a central site.

The use of electric power lines for meter reading, load control, and other communications purposes is well known in the art. It is known that a modulation voltage can be superimposed on a power system voltage to cause wave shape perturbations in the carrier wave. In the embodiment described hereinafter, the carrier wave is the voltage wave of an electrical power distribution system or network. Such systems are described in U.S. Pat. Nos. 4,106,007, 4,218,655, and 4,400,688 to Johnston et al, and 4,105,897 to Stratton et al, which patents are incorporated herein by reference.

Communication over an electric distribution network is a complex undertaking. Each customer service constitutes a branch in the distribution feeder, and the branching is so extensive that it is impractical to provide filter and by-pass circuitry at each branch point. The distribution network is not an attractive medium for conventional communications due to the attenuation and dispersion of the signals and because noise levels tend to be high. To overcome the high noise levels, it is generally necessary to use narrow band filtering, error-detecting and error-correcting codes, and relatively high signal power levels at low bit rates.

The aforementioned problems arise in two areas. The first, to which the present invention relates, concerns transmitting information from the central source in the direction of energy flow to the individual customer premises. This transmission of information in the direction of energy flow is referred to as "outbound" signaling. Information flow in the opposite direction, from customer to central site, is called "in-bound" signaling.

For "outbound" signaling, in order to reach line-to-line customers on the three-phase distribution network of a utility, for example, the modulation signal which carries the information preferably should have dominant positive and negative sequence components. This implies that the outbound modulation signal should not appear on all three phases simultaneously at equal strength and phase relationship.

At least on outbound signal detector system looks for signals disposed on the voltage carrier at the $-10°$ and the $+30°$ points on the waveform. A fixed signal threshold is typically used with that system to determine the presence or absence of signal at the detection points. This system has shown good performance under various conditions, but it could be improved.

At least one area of possible improvement concerns coping with the dynamics of the distribution network. For example, outbound signaling causes transient oscillations in the waveform which depend on the capacitance and load on the network at that time. Variation in loads results in a great variation in these transients, with resulting distortion of the waveform. Since loads on power distribution networks vary with time of day, this means that the reliability of the outbound signal detector can also vary with the time of day.

U.S. Pat. No. 4,914,418 to Mak et al., the disclosure of which is hereby incorporated herein by reference, describes one approach to coping with the dynamics of the distribution network. But under certain network conditions, even the Mak et al. approach could be improved.

A second possible area of improvement relates to crosstalk. In any three-phase system (which power distribution networks typically are), the voltage in any one phase is related to or coupled to the voltages in the other two phases. This leads to crosstalk. It should also be realized that the source configuration of the power distribution network also affects the severity of crosstalk.

A study of various source configurations reveals that the outbound signal around the voltage zero crossing changes in magnitude and frequency with respect to the zero crossing and depends on network loading. Moreover, during certain loading conditions crosstalk may be severe or less severe, creating difficulties in signal detection and identification. It has also been found that one type of crosstalk is due to the trailing end of the oscillatory signal wave.

It should be appreciated that the difficulty of detecting the outbound signal is further complicated by the fact that such detection normally takes place at a remote location (such as the electricity meter for a user) which has only limited space available. Moreover, for such detectors to be widely used they must be relatively low in cost.

SUMMARY OF THE INVENTION

Among the various objects and features of the present invention may be noted the provision of an outbound signal detection system capable of extracting the outbound signal under various dynamic load conditions.

Another object is the provision of such a system capable of rejecting crosstalk under various dynamic load conditions.

A third object is the provision of such a system which is relatively simple and inexpensive in construction.

A fourth object is the provision of such a system which adapts to the dynamics of the power distribution network.

Other objects and features will be in part apparent and in part pointed out hereinafter.

Briefly, the method of signal detection of the present invention is designed for use in a communication system in which outbound information is carried by cyclic waveforms over an electric power distribution network. The information is transmitted in the form of multi-bit messages carried by the cyclic waveform. The method includes obtaining signal data by sampling the cyclic waveform over a predetermined portion of successive cycles, and dividing the predetermined portion into a plurality of predetermined ranges. From a predetermined number of bits at the start of each message, the particular predetermined range which contains the greatest signal strength is selected. For the remaining bits of the message, only those samples in the selected range are analyzed to detect the outbound message.

The signal detection system of the present invention includes circuitry for obtaining signal data by sampling the cyclic waveform over a predetermined portion of successive cycles, the predetermined portion being divided into a plurality of predetermined ranges. It also includes circuitry responsive to the signal data for examining the signal data and, from a predetermined number of bits at the start of each message, selecting the particular predetermined range which contains the greatest signal strength. The range selecting circuitry is responsive to the selection of a particular predetermined range to analyze only those samples in the selected range, for the remaining bits of the message, to detect the outbound message.

BRIEF DESCRIPTION OF THE DRAWINGS

FIG. 1A is an enlarged portion of FIG. 1;

Similar reference characters indicate similar parts throughout the several views of the drawings.

DESCRIPTION OF THE PREFERRED EMBODIMENT

Figure 1:
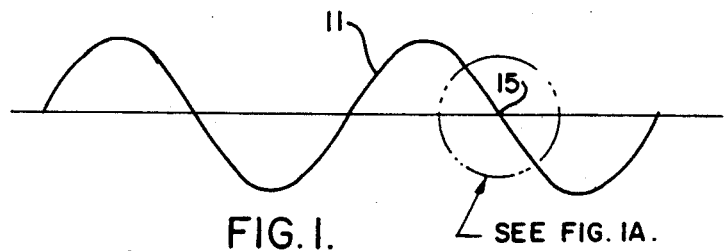
FIG. 1 is a graphical representation of the carrier waveform with signal imposed thereon of a communication system which uses the AC power waveform of an electric power distribution system as a carrier.

The present invention is designed for use in connection with a communication system which uses cyclic waveforms of the electric power distribution network to carry information in the form of multi-bit messages. Typical waveforms in such a communication system are illustrated in FIGS. 1 and 1A. In the system illustrated, the outbound signal is a modulation which is injected on the 60 Hz AC power waveform 11. The basic waveshape of the injected signal is a transient oscillatory waveform 13. Waveform 13 is located approximately next to a zero crossing 15 of the 60 Hz AC power waveform so that (ideally) the first two lobes of the waveform straddle the zero crossing. These lobes are detected by measuring the time difference, delta-T, between the crossing of a predetermined point by the modulated waveform and by the unmodulated waveform. Normally this is done by comparing the crossing times in adjacent half-cycles.

As is known but not shown in FIGS. 1 or 1A, crosstalk arises in such a system due to the cross coupling of the phases on a three-phase system of the AC power distribution system. The cross-talk modulation waveform is approximately located at multiples of thirty degrees both leading and lagging from the in-phase modulation illustrated in FIG. 1A.

In the particular communication system illustrated, every outbound message is preceded by a fixed data pattern, called the preamble, which is used to avoid false synchronization due to noise. For example, this pattern is a "0" synchronization bit, a "1110010" Barker code, and a "0" stop bit.

The prior technique for synchronizing the detector is illustrated in FIG. 1A. In this technique the signal detector determines the presence of a signal by testing only two points on the waveform, typically ten degrees before and thirty degrees after the zero crossing. The prior detector monitors the signal measured every halfcycle of the AC power waveform and decides to synchronize the bit framing based on the one sample (two points) of data. If the environment at the detector is noisy, then the detector will constantly be falsely synchronized by noise that meets the minimum signal level requirement (e.g., twenty microseconds of signal) and is a "0" bit. After the initial framing, the prior detector measures the data from each successive frame and determines if the measured signal is a "0" or a "1" bit. After false synchronization, the detector will normally recover during the preamble by testing each successive bit for correctness and aborting the message framing if an erroneous bit is determined. However, during recovery, valid synchronizations are sometimes missed.

Figure 2:
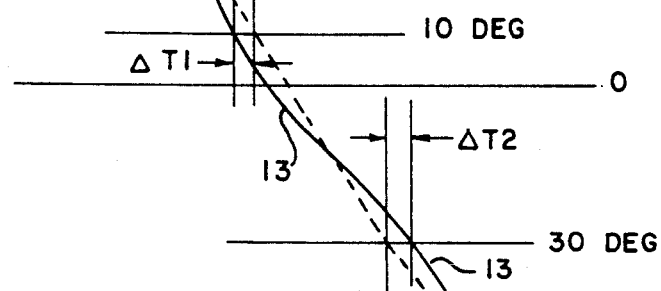
FIG. 2 is a block diagram of the signal detector system of the present invention.
Figure 2:
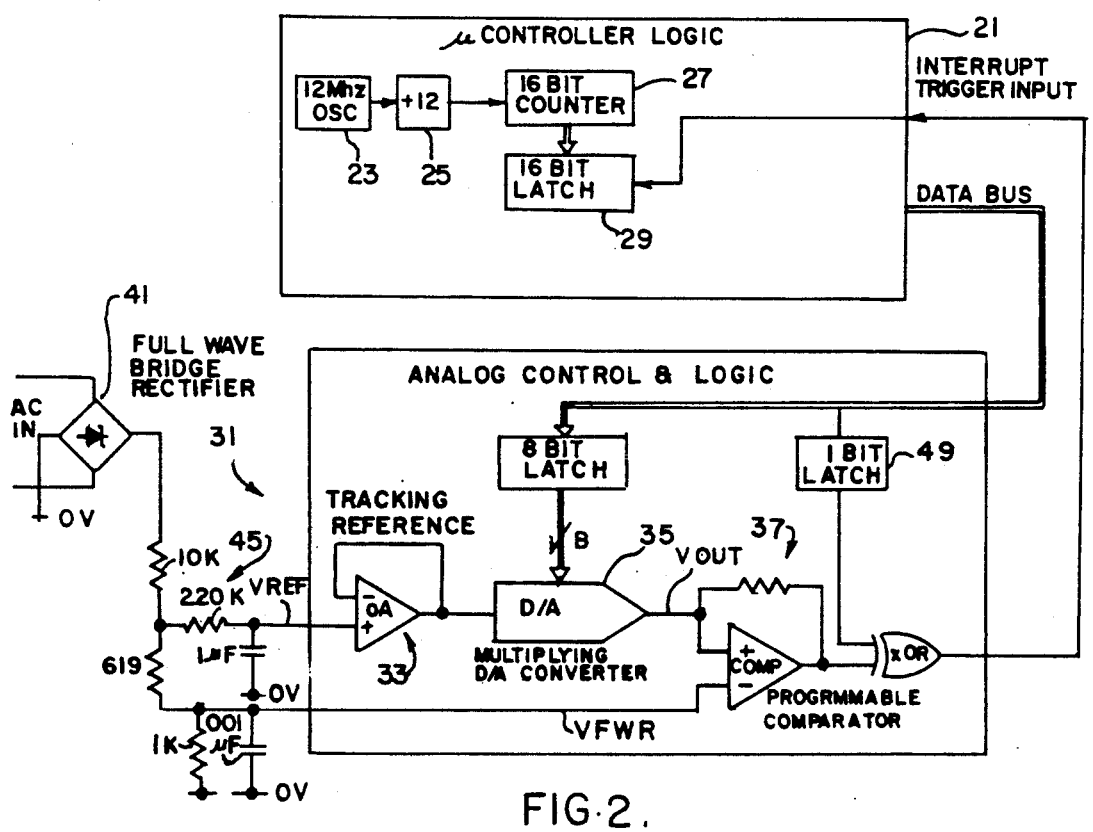

The signal detecting system of the present invention is illustrated in FIG. 2. The system includes a microcontroller 21 under software control, a 12 MHz oscillator 23, a divide-by-12 divider 25, a 16-bit counter 27, and a 16-bit latch 29. The output of the oscillator is provided through the divider to step counter 27. The output of the counter is supplied to latch 29, where it is latched upon receipt of a suitable trigger input, described below. This arrangement is used to measure the times, discussed above, so that the microcontroller can calculate the time differences, the delta-Ts, to detect the presence of signals on the waveform.

The outbound detector itself (labelled 31) is connected to microcontroller 21 to provide the trigger signal to latch 29. Detector 31 includes an op-amp voltage follower 33 for providing a tracking reference, a multiplying digital-to-analog converter (DAC) 35, and a comparator 37.

Figure 3A:
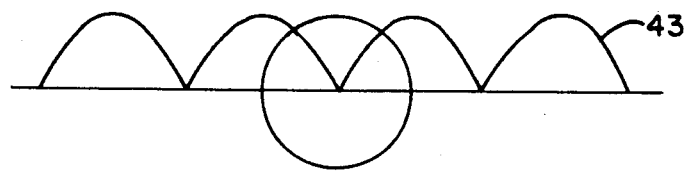
FIG. 3A is a graphical representation of the rectified waveform of FIG. 1 used in the present invention to detect signals imposed upon the carrier.

The 60 Hz AC power waveform is full-wave rectified by a rectifier 41. The rectified waveform 43, which is the output of rectifier 41, is shown in FIG. 3A. This output is filtered by a suitable RC network 45 to provide a DC reference voltage VREF, which is proportional to the average of the AC rectified line voltage. This DC reference voltage is supplied to voltage follower 33, which buffers the voltage.

The output of voltage follower 33 provides the reference for the 8-bit DAC 35. It is preferred that the DAC control register be memory mapped by on-chip decoder logic and controlled by microcontroller 21. The microcontroller accesses the six most significant bits of the DAC, while the lower two bits are controlled by the comparator and used for hysteresis.

The DAC output voltage VOUT is compared by comparator 37 to a scaled fullwave rectified AC line voltage VRWR obtained from rectifier 41. The output of the comparator provides the trigger signal to latch 29 in the microcontroller. The polarity of the trigger edge is controlled by a one-bit latch 49.

Figure 3B:
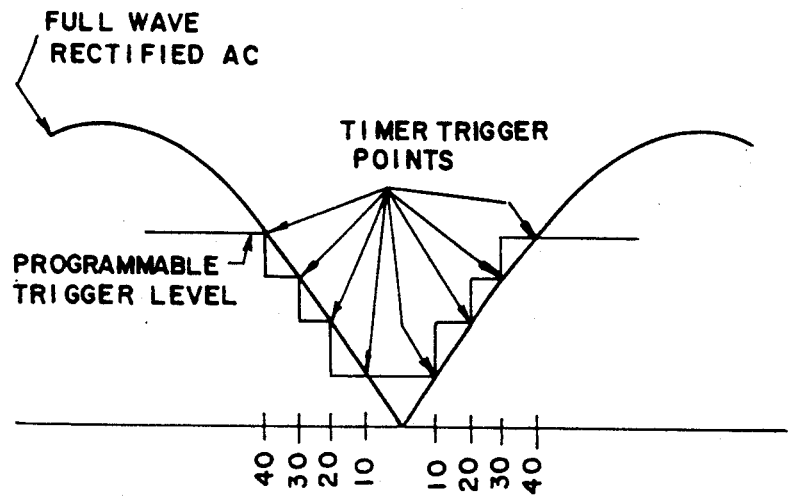
FIG. 3B is an enlarged portion of FIG. 1.

In use the DAC voltage VOUT is stepped at values which correspond to points between −50 degrees to 50 degrees, referenced to the zero crossing on the unrectified AC waveform. Although ten degree steps are shown in FIG. 3B for purposes of illustration, it is preferred that the steps be five degree steps, so that counts are latched into latch 29 every five degrees between −50 degrees and +50 degrees on the waveform. The microcontroller records these counts, and thereby can detect time differences, delta-Ts, from cycle to cycle.

In summary, trigger points are set by microcontroller 21, through DAC 35, to capture data in a free running counter/timer consisting of counter 27 and latch 29. The captured timer data for each five degree segment is stored for later processing. The useful signal is extracted by comparing the segment timings of adjacent cycles of the AC waveform. Since the receiving device can be connected across the AC power line without regard to polarity, this extraction is done every half cycle of the 60 Hz AC waveform, or 120 times per second.

As explained above, the frequency of the outbound signal will vary depending on the inductive and resistive loading and on the amount of power factor correcting shunt capacitors on the network at any given time. Since the outbound signal frequency is dynamic and varies depending on load, the outbound detector system of the present invention must be able to adapt to the changes in frequency. This requires that different groupings of measured segments be used to track the peak of the waveform for the varying frequencies.

It has been determined that the outbound signal could occupy the following in-phase ranges:

| | Very High Frequency: |
|---|---|
| $-20/-5$ range | 720 Hz with first peak at $-20$ deg. |
| | High Frequency: |
| $-15/+5$ range | 540 Hz with first peak at $-15$ deg. |
| $-5/+15$ range | 540 Hz with first peak at $-5$ deg. |
| | Medium Frequency: |
| $-15/+15$ range | 360 Hz with first peak at $-15$ deg. |
| $+5/+35$ range | 360 Hz with first peak at $+5$ deg. |
| $-5/+30$ range | 308 Hz with first peak at $-5$ deg. |
| | Low Frequency: |
| $-10/+30$ range | 270 Hz with first peak at $-10$ deg. |
| $-5/+35$ range | 270 Hz with first peak at $-5$ deg. |

As can readily be seen, these predetermined ranges do not correspond particularly well with the fixed $-10/+30$ range of the prior art systems illustrated in FIG. 1A except in one instance. The present system is, therefore, much more versatile than the prior art.

The microcontroller records the times, as set forth above, and groups them into the ranges set forth above. The signal for any particular range is the summation of the signals for each of the five degree segments measured with the range. This sum is stored in the microcontroller for each range and each bit of the preamble. Using the examples of ranges set forth above, the microcontroller stores eight sets of signal data (one for each predetermined range).

By internally comparing the signal strength in the various ranges, the microcontroller can lock onto the peak signal for that detector location at that particular time. More specifically, the microcontroller locks on to the peak signal during the preamble of the multi-bit message. For a preamble of the size discussed above, the system of the present invention stores range data for thirty-six half-cycles (t-0 to t-35). The microcontroller software, therefore, keeps a history of the last thirty-six measurements for each of the predetermined ranges. These measurements are tested every half cycle of the 60 Hz AC power waveform.

Figure 4:
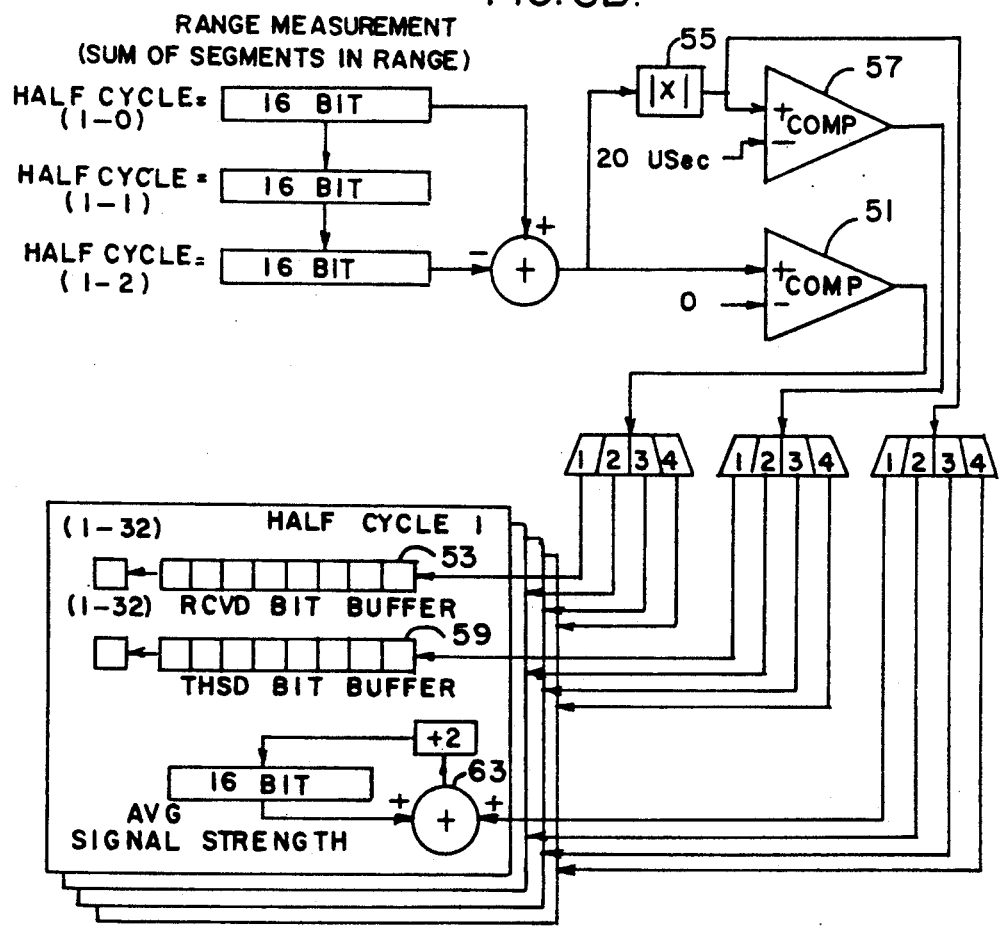
FIG. 4 is a block diagram illustrating data compression in the present invention.

Since the microcontroller typically has limited memory resources, the data is compressed or pretested before storage in shift registers. This data compression for a single range is illustrated in FIG. 4. It should be noted that for the particular preamble discussed above, the measurements for a valid preamble should result in a positive signal on half cycles t-0, t-4, t-12, t-16, t-22, t-26 and t-32. Negative signal will be measured on half cycles t-2, t-8, t-14, t-20, t-24 and t-28 for a valid preamble. Moreover, the absolute value of the signal on half cycle t-32 (the "0" sync bit) must be greater than the nominal noise threshold. This threshold was experimentally adjusted to twenty microseconds. Moreover, for a useful communications system, the average of the absolute values of the signals used must be greater than the nominal noise threshold. The data compression of FIG. 4 takes into account these criteria.

In the system of FIG. 4, the segment times of alternate half-cycles are summed as shown in FIG. 4 (to obtain the delta-Ts). Although summation of half cycles t-0 and t-2 are shown, it should be appreciated that this process is applied to each pair of alternate half cycle measurements for each range. The result of that summation is compared to zero to test its polarity by a comparator 51 and the result of that comparison is stored (for each of four half cycles) in a received bit buffer 53 as a bit decision. In this way the microcontroller can easily check the polarity of the received signal for correspondence to the synchronizing preamble.

The summation is also supplied through an absolute value block 55 to a second comparator 57 which compares the sum with the predetermined threshold of twenty microseconds. The output of comparator 57 is also a bit decision reflecting whether the detected signal exceeds the noise threshold. This bit decision is stored in a threshold bit buffer 59 for each four half cycles.

The third criteria, whether the average of the absolute values of the signals used exceed the nominal noise threshold, is determined in part by the absolute value of the signal being supplied from block 55 to a summer 63. There it is added to the previous average and divided by two to give a pseudo average which reflects the average of the signal over the nine bits of the preamble.

This process is applied to each of the predetermined ranges during the detection of the preamble. It provides an effective filter to impulse noise, a mechanism for identifying the peak signal frequency, and allows very weak signals to be locked onto. When the three criteria are met, the outbound detector is properly synchronized to the outbound message and can begin bit framing on the next half cycle. At that point and for the rest of that particular message, the detector examines only those samples in the range which has been selected as having the maximum average signal strength, based upon the analysis of the signal strength in each range throughout the preamble.

Upon receipt of the preamble of the next message the process is repeated so that the system adapts to the network characteristics for each message. Note that these characteristics may vary from location to location. Since each detector of the present invention adapts solely based upon its local conditions, the adaptation of each separate detector is essentially independent of all other detectors.

It should be noted that the above-described system is readily adaptable to also reject cross-talk. The power utility distribution system is composed of three phases which are sixty degrees out of phase with respect to each other. The communication system with which the present detection scheme operates is designed to inject outbound signal onto each of these phases independently and also across phase pairs independently. This is done to allow access to outbound receivers which may be connected on any phase or phase combination.

When outbound modulation is injected on an individual phase, some of the signal will be seen on phase combinations which use the phase. This signal will be at a reduced amplitude and be located either thirty degrees before or thirty degrees after the normal in-phase signal.

A similar condition exists for signal appearing on individual phases when outbound modulation is injected on phase combinations. In addition to this crosstalk signal, a very small amount of cross-talk signal can be detected at sixty degrees before and sixty degrees after zero crossing due to the signalling on other phases.

The characteristic frequency of this cross-talk signal is the same as in-phase signals and will vary in location with respect to zero crossing just as in-phase signals will vary. The cross-talk signals will overlap into the in-phase signal ranges, thereby causing the in-phase signal detector to detect and synchronize with the cross-talk signal. The amplitude of the signal in the in-phase ranges is normally less than that which can be measured in the cross-talk regions.

Much of this cross-talk can be detected by monitoring the following ranges:

| High Frequency Leading: | |
|---|---|
| −45/−25 range | 540 Hz with first peak at −45 deg. |
| −45/−20 range | 432 Hz with first peak at −45 deg. |
| Medium Frequency Leading: | |
| −45/−15 range | 360 Hz with first peak at −45 deg. |
| −35/−15 range | 360 Hz with first peak at −35 deg. |
| Very High Frequency Lagging: | |
| +20/+35 range | 720 Hz with first peak at +20 deg. |
| High Frequency Lagging: | |
| +15/+50 range | 432 Hz with first peak at +15 deg. |

To reject cross-talk using the present invention, the in-phase signal which is detected is rejected, as overlap from cross-talk, by monitoring the above cross-talk detection ranges, applying the sam pattern recognition criteria for synchronization described above, and rejecting in-phase synchronization when cross-talk signal strength is greater than in-phase signal strength.

In view of the above, it will be seen that the various objects and features of the present invention are achieved and other advantageous results are attained. It will be appreciated that the constructions and methods disclosed herein are illustrative only and are not to be interpreted in a limiting sense.

What is claimed is:

1. In a communication system in which outbound information is carried by cyclic waveforms over an electric power distribution network, said information being transmitted in the form of multi-bit messages, a signal detection method for detecting the outbound messages at a location physically separated from the source of the outbound messages, said signal detection method comprising:
   (a) obtaining signal data by sampling the cyclic waveform over a predetermined portion of successive cycles;
   (b) dividing the predetermined portion into a plurality of predetermined ranges;
   (c) from a predetermined number of bits at the start of each message, selecting the particular predetermined range which contains the greatest signal strength;
   (d) for the remaining bits of the message, analyzing only those samples in the selected range to detect the outbound message.

2. The signal detection method as set forth in claim 1 wherein at least some of the predetermined ranges overlap.

3. The signal detection method as set forth in claim 1 wherein one of the predetermined ranges is from approximately twenty degrees to approximately five degrees before a zero crossing of the waveform.

4. The signal detection method as set forth in claim 1 wherein one of the predetermined ranges is from approximately fifteen degrees before to approximately five degrees after a zero crossing of the waveform.

5. The signal detection method as set forth in claim 1 wherein one of the predetermined ranges is from approximately five degrees before to approximately fifteen degrees after a zero crossing of the waveform.

6. The signal detection method as set forth in claim 1 wherein one of the predetermined ranges is from approximately fifteen degrees before to approximately fifteen degrees after a zero crossing of the waveform.

7. The signal detection method as set forth in claim 1 wherein one of the predetermined ranges is from approximately five degrees to approximately thirty-five degrees after a zero crossing of the waveform.

8. The signal detection method as set forth in claim 1 wherein one of the predetermined ranges is from approximately five degrees before to approximately thirty degrees after a zero crossing of the waveform.

9. The signal detection method as set forth in claim 1 wherein one of the predetermined ranges is from approximately ten degrees before to approximately thirty degrees after a zero crossing of the waveform.

10. The signal detection method as set forth in claim 1 wherein one of the predetermined ranges is from approximately five degrees before to approximately thirty-five degrees after a zero crossing of the waveform.

11. The signal detection method as set forth in claim 1 wherein steps (c) and (d) are repeated for each subsequent message, whereby the system adapts to changing conditions on the network from message to message.

12. The signal detection method as set forth in claim 1 wherein each message begins with a fixed, multi-bit preamble, said particular predetermined range which contains the greatest signal strength being selected based upon the signal strength of the preamble at the location of detection.

13. The signal detection method as set forth in claim 12 wherein the range with the maximum signal strength is determined by adding those samples in each predetermined range which exceed a threshold, and comparing the sums for the various ranges to find the largest sum.

14. The signal detection method as set forth in claim 1 wherein the method of detection is performed independently at each remote location so that each location adapts with each message to the particular network characteristics at that particular location.

15. The signal detection method as set forth in claim 1 wherein the selected range includes at least two peaks of the outbound signal.

16. The signal detection method as set forth in claim 1 wherein each message begins with a fixed, multi-bit preamble, said preamble being used to identify valid message to the remote detectors, each of the predetermined ranges being examined for the bit pattern corresponding to the preamble prior to selection of the predetermined range with the maximum signal strength.

17. The signal detection method as set forth in claim 1 further including preselecting ranges in which cross-talk signals are likely to appear, monitoring the cross-talk ranges for signals, and rejecting in-phase messages when the signal strength in the in-phase range is less than the signal strength in at least one of the cross-talk ranges.

18. In a communication system in which outbound information is carried by cyclic waveforms over an electric power distribution network, said information being transmitted in the form of multi-bit messages, a signal detection system for detecting the outbound messages at a location physically separated from the source of the outbound messages, said signal detection system comprising:

means for obtaining signal data by sampling the cyclic waveform over a predetermined portion of successive cycles, said predetermined portion being divided into a plurality of predetermined ranges;

means responsive to the signal data for examining the signal data and, from a predetermined number of bits at the start of each message, selecting the particular predetermined range which contains the greatest signal strength, said means being responsive to the selection of a particular predetermined range to analyze only those samples in the selected range, for the remaining bits of the message, to detect the outbound message.

19. The outbound signal detection system as set forth in claim 18 wherein at least some of the predetermined ranges overlap.

20. The outbound signal detection system as set forth in claim 18 wherein one of the predetermined ranges is from approximately twenty degrees to approximately five degrees before a zero crossing of the waveform.

21. The outbound signal detection system as set forth in claim 18 wherein one of the predetermined ranges is from approximately fifteen degrees before to approximately five degrees after a zero crossing of the waveform.

22. The outbound signal detection system as set forth in claim 18 wherein one of the predetermined ranges is from approximately five degrees before to approximately fifteen degrees after a zero crossing of the waveform.

23. The outbound signal detection system as set forth in claim 18 wherein one of the predetermined ranges is from approximately fifteen degrees before to approximately fifteen degrees after a zero crossing of the waveform.

24. The outbound signal detection system as set forth in claim 18 wherein one of the predetermined ranges is from approximately five degrees to approximately thirty-five degrees after a zero crossing of the waveform.

25. The outbound signal detection system as set forth in claim 18 wherein one of the predetermined ranges is from approximately five degrees before to approximately thirty degrees after a zero crossing of the waveform.

26. The outbound signal detection system as set forth in claim 18 wherein one of the predetermined ranges is from approximately ten degrees before to approximately thirty degrees after a zero crossing of the waveform.

27. The outbound signal detection system as set forth in claim 18 wherein one of the predetermined ranges is from approximately five degrees before to approximately thirty-five degrees after a zero crossing of the waveform.

28. The outbound signal detection system as set forth in claim 18 wherein the selection of a particular range for any given message is independent of the range selected for any other message, whereby the system adapts to changing conditions on the network from message to message.

29. The outbound signal detection system as set forth in claim 18 wherein each message begins with a fixed, multi-bit preamble, said particular predetermined range which contains the greatest signal strength being selected based upon the signal strength of the preamble at the location of detection.

30. The outbound signal detection system as set forth in claim 29 wherein the range with the maximum signal strength is determined by adding those samples in each predetermined range which exceed a threshold, and comparing the sums for the various ranges to find the largest sum.

31. The outbound signal detection system as set forth in claim 18 wherein the selected range includes at least two peaks of the outbound signal.

32. The outbound signal detection system as set forth in claim 18 wherein each message begins with a fixed, multi-bit preamble, said preamble being used to identify valid messages to the remote detectors, each of the predetermined ranges being examined for the bit pattern corresponding to the preamble prior to selection of the predetermined range with the maximum signal strength.

33. The outbound signal detection system as set forth in claim 18 wherein the range selecting means further includes means for preselecting ranges in which crosstalk signals are likely to appear, monitoring the crosstalk ranges for signals, and rejecting in-phase messages when the signal strength in the in-phase range is less than the signal strength in at least one of the cross-talk ranges.

* * * * *